United States Patent [19]

Belyanin et al.

[11] 4,259,876

[45] Apr. 7, 1981

[54] MECHANICAL ARM

[76] Inventors: Petr N. Belyanin, ulitsa Tukhachevskogo, 23, korpus 2, Kv. 186; Konstantin V. Frolov, Ljublinskaya ulitsa, 3, kv. 123; Aron E. Kobrinsky, ulitsa Dmitria Ulyanova, 4/34, korpus 5, kv. 267; Alfred I. Korendyasev, ulitsa Kosmonavtov, 14, korpus 1, kv. 90; Boris S. Rozin, 2 ulitsa Mashinostroenia, 9; Boris L. Salamandra, ulitsa B. Cherkizovskaya, 5, korpus 8, kv. 35; Felix P. Sokolovsky, Leningradsky prospekt, 75a, kv. 90; Jury V. Stolin, ulitsa Gorkogo, 40, kv. 14; Leonid I. Tyves, I348, Yaroslavskoe shosse, 12, kv. 22, all ofMoscow, U.S.S.R.

[21] Appl. No.: 81,254

[22] Filed: Oct. 2, 1979

[51] Int. Cl.³ .......................... B25J 9/00; B25J 11/00
[52] U.S. Cl. ........................................... 74/469; 414/7
[58] Field of Search ............... 74/89.2, 89.21, 89.22, 74/469, 471 XY, 491, 519, 521; 414/1–8

[56] References Cited

U.S. PATENT DOCUMENTS

| 3,212,651 | 10/1965 | Specht et al. | 414/7 |
| 3,631,737 | 1/1972 | Wells | 74/469 |

FOREIGN PATENT DOCUMENTS

| 444633 | 10/1974 | U.S.S.R. | 414/5 |
| 503709 | 3/1976 | U.S.S.R. | 414/4 |
| 547335 | 4/1977 | U.S.S.R. | 414/1 |
| 560746 | 9/1977 | U.S.S.R. | 414/5 |
| 564150 | 9/1977 | U.S.S.R. | 414/7 |
| 590136 | 1/1978 | U.S.S.R. | 414/1 |

Primary Examiner—Lawrence J. Staab
Attorney, Agent, or Firm—Fleit & Jacobson

[57] ABSTRACT

The disclosed mechanical arm comprises a base having mounted thereon a plurality of pivotally connected links, each having its own individual motor operatively connected through driving kinematic chains with said links, and a tensioning mechanism including a tensioning member and kinematic chains connecting said tensioning member with the links; said tensioning mechanism being provided with differential gears in a number equalling that of said driving kinematic chains tensioned by said tensioning member, one output of each said differential gears being connected to said individual motor, and two other outputs thereof being connected to the preceding and successive ones of said differential gears; the two unoccupied outputs of the terminal ones of said differential gears being connected, respectively, to said base and said tensioning member.

The invention is primarily intended for automation of main and auxiliary operations in various industries, e.g. for handling of production tools and equipment. The invention can be utilized in various technologies, e.g. in machining and thermal treatment, in foundry production, in forging, pressing, welding, assembling, coating, as well as in operations performed in hazardous environment, in nuclear power plants, deep underwater and outer space projects, and in medicine.

31 Claims, 24 Drawing Figures

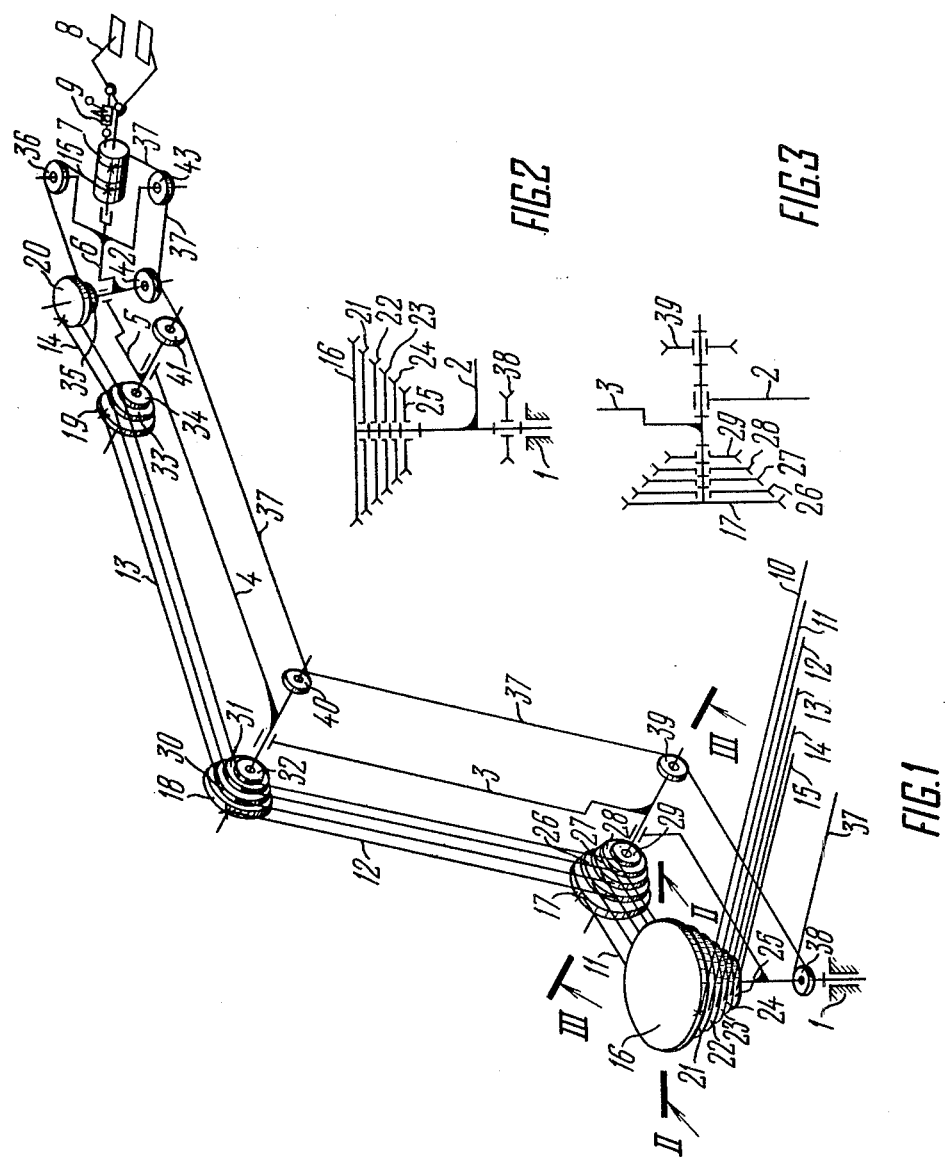

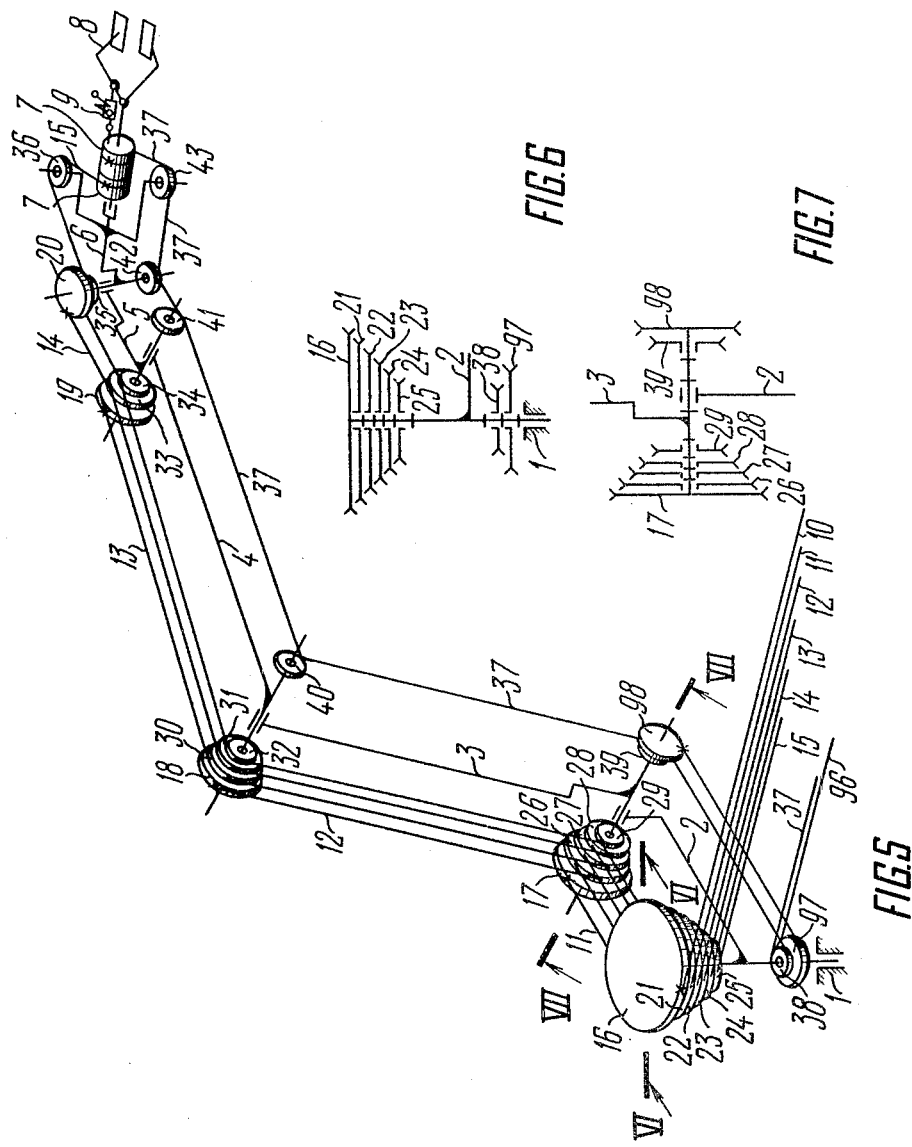

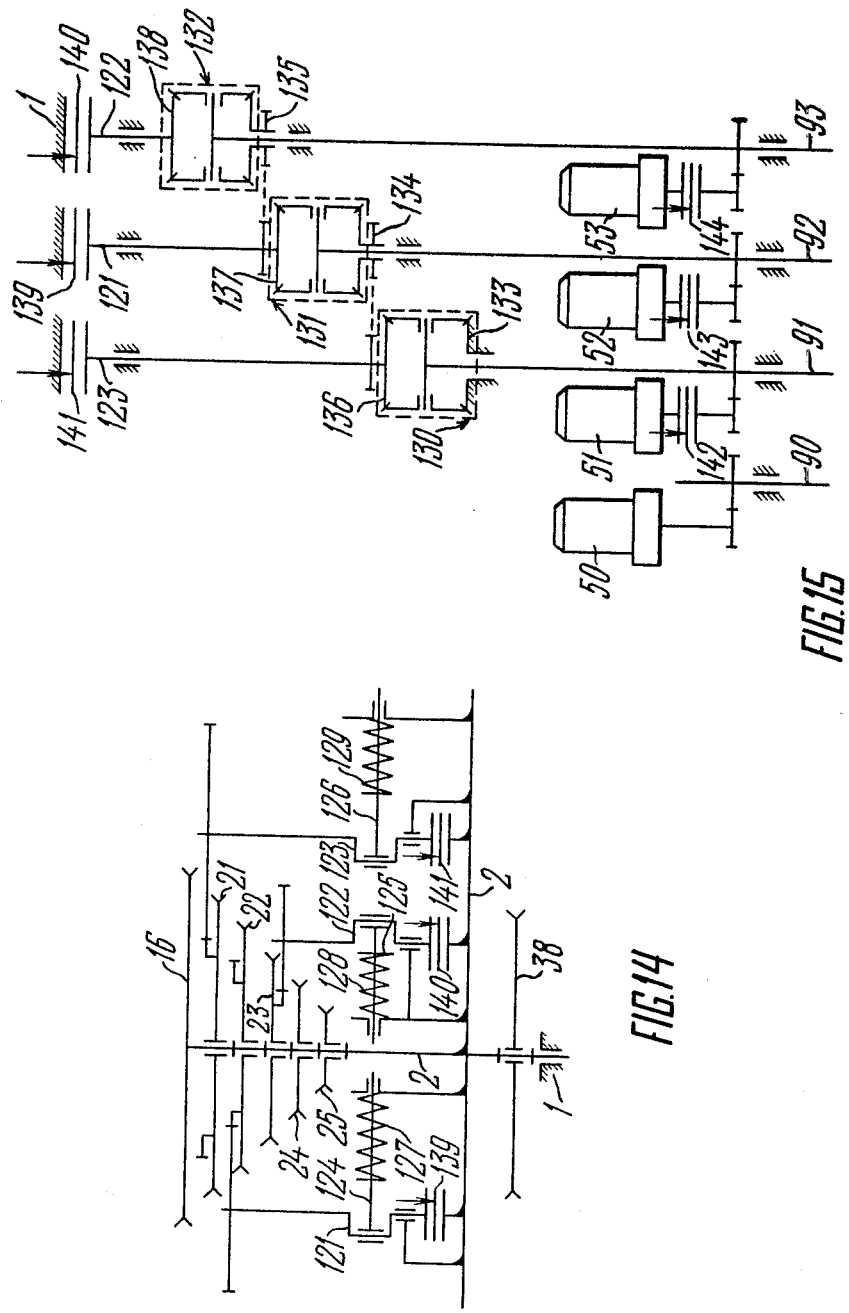

MECHANICAL ARM

FIELD OF THE INVENTION

The present invention relates to improvements in or relating to automatically controlled manipulators, and more particularly it relates to the design of a mechanical arm.

The invention is primarily intended for automation or main and auxiliary operations in various industries, e.g. for handling of production tools and equipment. The invention can be utilized in various technologies, e.g. in machining and thermal treatment, in foundry production, in forging, pressing, welding, assembling, coating, as well as in operation performed in hazardous environment, such as nuclear power plants, deep underwater and outer space projects, and in medicine.

BACKGROUND OF THE INVENTION

The problem of creating an apparatus of the herein described type has been brought about by the growing requirements of industries for means of automation of main and auxiliary production and handling operations, particularly, wherever the working environment is hard, monotonous or hazardous; and also when the range of manufactured articles is vast and frequently varied.

The present-day prerequisites for means of automation of production and handling operations include the ability to precisely position and orient a component in the working zone of various production plant, the versatility and maneuverability, and also ready adjustability for different articles and jobs.

Quite naturally, present-day means of automation shall not hamper the operating rate of the associated production equipment, i.e. they are expected to be of a high throughput themselves.

The above prerequisites are inherently related to the structural features of each specific means of automation. One of the present-day types of the means of automation and mechanization is a mechanical arm. The specific requirements to be met by a mechanical arm as a means of automation are the minimum weight of the links of the arm, the incorporability of any type of a drive, e.g. an electric drive, and the dynamic characteristics and maneuverability of the arm being uninfluenced by its mass and dimensions. Another specific requirement is the provision for arranging in the structure controllable kinematic connections of the desired degrees of freedom, to facilitate the control. The abovelisted tasks are attained in a mechanical arm in accordance with the presently disclosed invention.

DESCRIPTION OF THE PRIOR ART

At present, there are known two major principally different structures of a mechanical arm. The most popular one is the structure with drive means arranged on the movable links of the arm (cf. industrial robot, Model IRC-30 marketed by Tokyo-Keiki, Japan).

This arrangement increases the moving masses of the arm and its dimensions, whereby the productivity of the arm is somewhat limited, and the dynamics of its motion are strained.

In other major structure of the prior art the individual drives are mounted on the base of the mechanical arm, with kinematic chains leading from the drives to the links of the arm (cf. "Stanki i Instrumenty (Machines and Tooling)" Magazine, No. 4, 1976, article "Principle of Designing the Actuating Systems for Programmed Manipulators" by A. E. Kobrinsky et al., page 4., FIG. 1b). Unlike the first-mentioned structure, the last-mentioned one enables to have more lightweight and maneuverable designs of mechanical arms.

However, the extended kinematic chains necessitated by the last-mentioned structure increase the errors in executing the required movements, on account of the play in the transmissions and the inadequate rigidity of the entire driving system. On the other hand, the arrangement of the motors on the base more often than not necessitates the incorporation of a complex planetary mechanism.

There is known a mechanical arm widely employed in operations performed in hazardous environment (see "Designing Manipulator Drives" by S. N. Andreenko, in Russian, "Mashinostroyeniye" Publishers, Leningrad, 1975, p.27, FIGS. 1, 2). The arm comprises a base; "n" pivotally connected links, with "m" successively arranged links (n>m) having pivots with horizontal axes; driving kinematic chains for actuating the links through relative movements; individual motors mounted on the base and spring-type counter-balancing mechanisms. In this arm there has been solved the problem of balancing the "m" successive links with the horizontal pivot axes, and thus there has been attained the task of reducing the required installed capacity of the individual driving motors. However, this structure of the mechanical arms is not free from a disadvantage resulting from its kinematic chain making up a planetary mechanism, which leads to kinematic interinfluence of various degrees of freedom, i.e. with one of the individual drives rotating, there takes place the motion not only of the respective link, but of the successive ones, as well. This fact considerably complicates the programming of the motions of the arm and the employment of the latter as an automatically controlled device.

This shortcoming is partly eliminated in the structure of a mechanical arm with program control, disclosed in "Programming a Multilink Manipulator with Torque Control" by Takase K., Inowe Kh., Sato K. in "Densi Shdzjusu soju kenkuse Ikho" 37, No. 3, 1973, pp. 25 to 39, Japan). The arm includes a base supporting pivotally interconnected links, each having its own individual drive connected to the links through kinematic chains of the rope-and-pulley type, the kinematic chains defining the drive chains; a tensioning mechanism with a tensioning member and a mechanism for compensating for the kinematic interinfluence of the motion of the links.

The last-described structure enables to take up the play and thus to narrow down the no-response zone of the system; besides, in this structure the influence of a movement in one degree of freedom upon other degrees of freedom has been reduced.

However, this structure is still uncapable of completely compensating for kinematic interinfluence of the various degrees of freedom. Therefore, the structure would not provide the required accuracy in some technologies. Besides, the number of the driving and tensioning kinematic chains is twice the number of the degrees of freedom, which, with an increased number of the movable links, complicates the structure of the arm, increases its weight and affects its reliability. It should be also pointed out that all the degrees of freedom in the abovedescribed structures are program-controlled, whereby the program unit is loaded to the maximum with the control operations, which curbs down its ability to operate on the real-time or on-line basis, so that sometimes it is necessary to slow down the movements of the arm. Besides, the accuracy of executing a motion along a contour is not always satisfying, on account of the discrete character of the control system and the presence of the no-response zone of the drive.

It should be also remembered that a great share of the motions of the arm is claimed by the so-called "stereotype" motions whereat certain kinematic preconditions should be met, e.g. a permanent attitude of a link in space. The stereotype motions are usually required by the specific production-wise features of the employment of the arm, and should be performed with an enhanced accuracy. In the abovedescribed structure provisions for locking the kinematic chains are lacking, whereby stereotype motions would not be executed with an increased accuracy.

A characteristic feature of the last-described arm is the incorporation of the mechanism for compensating for the weight of the links. The mechanism has its operation based on counterweights bringing about inadvertently a certain time lag, so that the time of accelerating and halting the system is increased, same as the loads applied to the elements of the structure, which affects the dynamic characteristics of the arm.

SUMMARY OF THE INVENTION

It is an object of the present invention to create a mechanical arm wherein the functional capabilities should be extended, and all the kinematic chains should be tensioned by the minimized number of tensioning members.

It is another object of the present invention to reduce the required capacity of the individual motors and to simplify the programming of the operation.

It is still another object of the present invention to reduce the weight of the mechanical arm and to create preconditions for actuating it through stereotype motions.

These and other objects are attained in a mechanical arm . . . comprising a base having mounted thereon a plurality of pivotally connected links, each having its own individual motor operatively connected through kinematic chains with the links, thus making up driving kinematic chains, and a tensioning mechanism including tensioning members and tensioning kinematic chains connecting the tensioning members with the links, in which mechanical arm, in accordance with the present invention, the tensioning mechanism includes differential gears in a number equalling that of the driving kinematic chains tensioned by the tensioning member, one output of each differential gear being connected to the individual motor and two other outputs thereof being connected to the preceding and successive ones of said differential gears, the two free outputs of the extreme or terminal ones of the differential gears being connected, respectively, to the base and to the tensioning member.

The structure of a mechanical arm embodying the present invention provides for significantly enhancing the accuracy ratings of the arm, simplifying the arm and making it less costly. This has been made possible by the reduced number of the kinematic chains and tensioning members, and by ensuring permanent tensioning of all the driving kinematic chains by the minimized number of the tensioning members and tensioning kinematic chains. It is possible, in principle, to tension all the driving kinematic chains of the mechanical arm with a single tensioning member and a single tensioning kinematic chain, in which case the arm is minimally heavy and maximally simple.

It is expedient to provide the arm with an additional tensioning member connected to the output of one of the differential gears, and also connected through an additional kinematic chain with the respective link of the mechanical arm.

This provides for an optimized selection of the structural parameters of the elements of the driving and tensioning kinematic chains, influencing the overall dimensions of the arm. Besides, this feature makes it possible to set different tensioning efforts in the kinematic driving chains of different ones of the links.

The kinematic chain of the tensioning mechanism may be in the form of a rope-and-pulley transmission.

This technical solution is the simplest structurally and enhances the reliability of the kinematic tensioning chain. Furthermore, the arrangement of the rope-and-pulley transmission in the structure of a mechanical arm presents no particular design problems, since a rope, although small, is capable of transmitting considerable actuating efforts.

It is expedient that the tensioning members of the tensioning mechanism should include torsion bars.

Tensioning members of this kind offer the advantage of permissibility of great twisting efforts and considerable twisting angles.

It is expedient that the mechanical arm should include a mechanism for compensating for kinematic interinfluence of the movements of the links, including serially connected differential gears, one output of each one of the latter being connected with the respective driving kinematic chain and with the output of the successive differential gear, and the other output thereof being connected with the individual motor and with the output of the respective differential gear of the tensioning mechanism, one of the outputs of the first differential gear of the compensation mechanism being secured to the base.

The above technical solution not only eliminates the drawbacks associated with the kinematic interinfluence of the drives and resulting in complicated programming, but also enables one to create a structure of the arm wherein the compensation mechanism per se is tensioned by the already existing tensioning mechanism, with the play and backlash therein eliminated, same as in the kinematic drive chains of the links, which enhances the accuracy of compensating for the interinfluence of the drives and of the movement of the mechanical arm, as a whole.

It is further expedient that the mechanical arm should include a mechanism for compensating for the weight of the links, comprising sine mechanisms and resilient elements arranged between the outputs and supports of the sine mechanisms, the input of each sine mechanism being connected with the driving kinematic chain of the respective link.

Owing to this, at any moment and with any shape of the mechanical arm the shafts of the individual motors would be relieved of the weight of the links by the torques developed by the resilient elements of the mechanism for compensating for the weight of the links. Consequently, it becomes possible to use individual motors of a smaller power output, and that without affecting the swiftness of the response.

It is further expedient that the mechanism for compensating for the weight of the links should include interconnected differential gears arranged between the inputs of the sine mechanisms and the driving kinematic chains of the links. This feature enables one to accommodate the weight-compensating mechanism on different elements of the arm; for instance, the mechanism may be mounted on the base, which relieves the movable links of the arm of the weight of the mechanism and of the inertia of its components.

It is still further expedient that the mechanical arm should be capable of being actuated through a wide range of stereotype motions, such as:

(i) that with the gripper being inclined at a permanent angle relative to a coordinate plane, e.g. horizontal;

(ii) that with the gripper moving along either one of two mutually perpendicular directions in the working space of the arm;

(iii) that with the gripper moving along radii extending through the axis of the rotational couple of any one of the pivots;

(iv) that with a permanent attitude of the gripper in a coordinate plane, e.g. horizontal.

The actuation through stereotype motions, owing to the incorporation in the structure of the arm of corresponding mechanisms makes it possible, with a continuous path control, to significantly enhance the accuracy of the execution of the motions, due to the rigid kinematic relationship between the angles of rotation of the links. Furthermore, during the execution of a stereotype motion the program control unit is relieved of the control over some degrees of freedom, and thus is usable for solving other problems involved in the control of the mechanical arm.

In accordance with the abovesaid, it is expedient that the mechanical arm should include two groups of clutches, the clutches of the first group connecting the inputs of the sine mechanisms with their supports, and the clutches of the second group connecting the respective individual motors with the driving kinematic chains.

This provides for a stereotype motion with a permanent inclination angle of a link to a coordinate plane, e.g. horizontal. Such a motion is required by a number of production operations, e.g. welding, handling open vessels filled with a fluid, etc.

The mechanical arm may be provided with an additional kinematic chain connecting the outputs of the sine mechanisms, and two clutches of which one is included in the additional kinematic chain and the other is arranged between the individual motor and driving kinematic chain of one of the links.

This makes it possible to actuate the arm through stereotype motions along either one of two mutually perpendicular directions in the working space. Motions of this kind are typical at serving various production equipment and at handling jobs associated with storehouses, storage magazines and racks, etc.

The mechanical arm may be also provided with yet another kinematic chain connecting the outputs of the sine mechanisms, and two clutches of which one is included in this additional kinematic chain and the other one is arranged between the individual motor and driving kinematic chain of one of the links.

This makes it possible to actuate the arm through a stereotype motion along radii, e.g. those including the axis of the pivot of two adjacent links of the same length. Motions of this kind might be called for not only by the production requirements, but also in cases where the working area is crowded, and numerous obstacles are to be cleared.

It is expedient, with the mechanical arm incorporating the mechanism for compensating for kinematic interinfluence of the movements of the links, that the arm should include an additional kinematic chain interconnecting the driving kinematic chains of adjacent links, and two clutches of which one is included in the additional kinematic chain and the other one is arranged between the individual motor and the driving kinematic chain of one of the links.

The last-described structure provides for the previously described stereotype motion, but it is simpler in the mechanical arm provided with the mechanism for compensating for kinematic interinfluence of the movements of the links.

It is expedient to provide the mechanical arm with yet another kinematic chain interconnecting the shafts of the independent motors actuating the links relative to the pivots with vertical axes, and with two clutches of which one is included in this additional kinematic chain and the other one is arranged between the individual motor and driving kinematic chain of one of the links.

This structure provides for a stereotype motion with a permanent attitude of any link in a coordinate plane, e.g. horizontal one. Motions of this kind are often required in assembling operations, placing articles into containers and packaging.

It is expedient that all the clutches incorporated in the structure of the mechanical arm should be program-controlled.

This provides for a higher versatility of the mechanical arm, for program-controlled initiation and termination of various stereotype motions and their combinations.

BRIEF DESCRIPTION OF APPENDED DRAWINGS

The invention will be described hereinbelow in connection with embodiments thereof, with reference being had to the accompanying drawings, wherein:

FIG. 1 illustrates pivotally links of a mechanical arm, with the components of the driving and tensioning kinematic chains mounted thereon;

FIG. 2 is a sectional view taken on line II—II of FIG. 1;

FIG. 3 is a sectional view taken on line III—III of FIG. 1;

FIG. 5 shows a modified version of pivotally connected links of the mechanical arm, with the elements of the driving kinematic chains and of the two tensioning chains mounted thereon;

FIG. 6 is a sectional view taken on line VI—VI of FIG. 5;

FIG. 7 is a sectional view taken on line VII—VII of FIG. 5.

FIG. 14 shows the same as FIG. 10, plus groups of clutches to provide for a stereotype motion;

FIG. 15 shows a kinematic chain providing for a stereotype motion of the links with a permanent inclination angle to a horizontal plane, for the embodiment illustrated in FIG. 9;

DETAILED DESCRIPTION OF THE INVENTION

Figure 4:
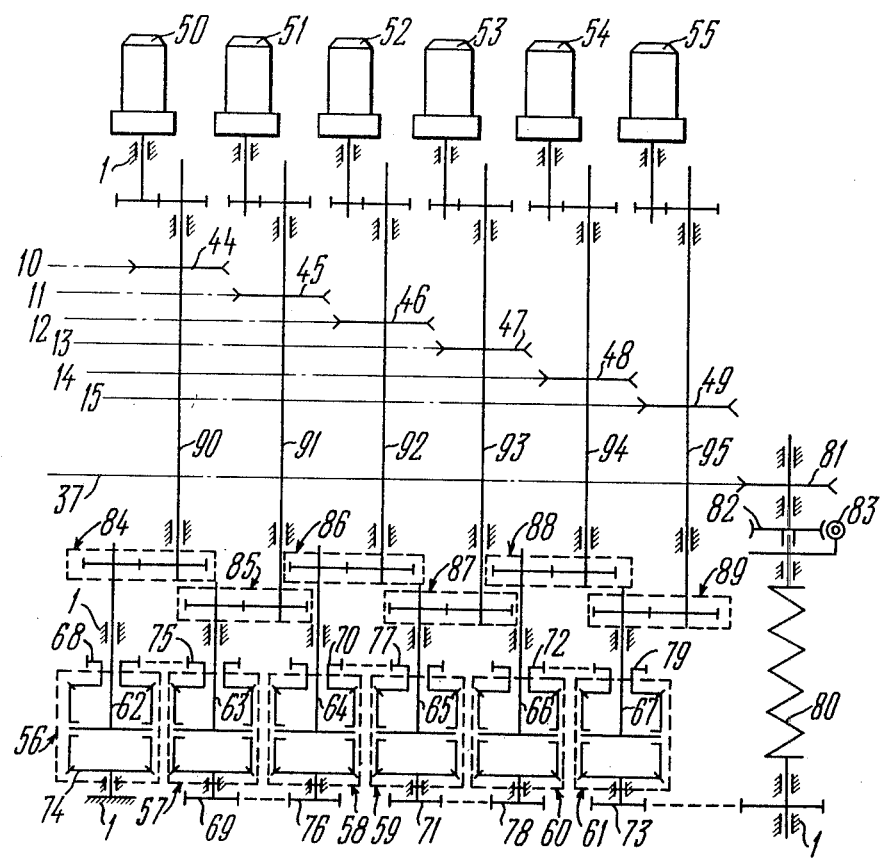
FIG. 4 shows a base supporting the tensioning mechanism and the individual motors actuating the links of the arm illustrated in FIG. 1.

Referring now to the appended drawings, there is illustrated in FIG. 1 a structural diagram of the skeleton of a mechanical arm to which the description hereinbelow will be related, although some details of this diagram are of no essential value for the essence of the technical solutions to be described. The mechanical arm embodying the invention comprises a base 1 (FIG. 1) and links 2, 3, 4, 5, 6, 7 and 8 successively pivotally interconnected and forming the skeleton of the mechanical arm. The link 2 is pivotally attached to the base 1. A characteristic feature of the mechanical arm being described is that the axes of the successive pivots, save the axis of the link 7, either are parallel or intersect one another. It should be pointed out that the actuator of the link 8 which is the jaw of a gripper is a solenoid 9, although the incorporation of this solenoid is not essential for the invention, because any suitable type of an actuator may be employed. For actuation of the links 2, 3, 4, 5, 6 and 7 any kind of gearing may be used, e.g. toothed, chain or belt gearing, or their combinations. In the embodiment being described the simplest form of transmissions is used, viz. the rope-and-pulley type. A specific feature of the presently described embodiment is that it has a single driving rope run per each degree of freedom and a single tensioning run for all the degrees of freedom, all the driving runs being built on the same principle, i.e. the respective driving runs of the links 2, 3, 4, 5, 6 and 7 are in the form of ropes 10, 11, 12, 13, 14 and 15 led from the mechanisms mounted on the base 1. Each rope 10, 11, 12, 13, 14 and 15 runs about respective guide pulleys mounted for free rotation about the pivot axes of the intermediate links, and is secured to the driven pulley fast with the respective driven link.

Thus, the links 2, 3, 4, 5 and 6 are fast with the respective driven pulleys 16, 17, 18, 19 and 20, while the link 7 is in the form of a driven drum. The abovementioned guide pulleys of the respective ropes 10, 11, 12, 13, 14 and 15 are mounted for free rotation about the pivot axes of the links 2, 3, 4, 5, 6 and 7. Rotating about the pivot axis of the link 2 are guide pulleys 21, 22, 23, 24 and 25; about the pivot axis of the link 3 are pulleys 26, 27, 28 and 29; about the pivot axis of the link 4 are pulleys 30, 31 and 32; about the pivot axis of the link 5 are pulleys 33 and 34; and the axis of the pivot of the link 6 supports for free rotation a single guide pulley 35. An additional guide pulley 36 is provided for transmitting rotation to the link 7.

Thus, the driving kinematic chain of the link 2 includes the rope 10 secured to the driven pulley 16 of this link 2.

The driving kinematic chain of the link 3 includes the rope 11, the guide pulley 21 freely rotatable about the pivot axis of the link 2 and the driven pulley 17 secured to the pivot axis of the link 3. The driving kinematic chain of the link 4 includes the rope 12, the guide pulleys 22 and 26 and the driven pulley 18 fast with the link 4. The driving kinematic chain of the link 5 is structurally similar, including as it does the rope 13, the guide pulleys 23, 27 and 30, the driven pulley 19. In case of the link 6 there are the rope 14, the guide pulleys 24, 28, 31 and 33 and the driven pulley 20; and in case of the link 7 there are the rope 15, the guide pulleys 25, 29, 32, 34, 35, 36, and the driven pulley is the link 7 per se, in the form of the drum.

The single tensioning rope run 37 (FIG. 1) is led from mechanisms mounted on the base 1, made to run about guide pulleys 38, 39, 40, 41, 42, 43 mounted for free rotation about the pivot axes of the links 2, 3, 4, 5, 6 and secured to the link 7 in the form of the drum.

In the embodiment being described the guide and driven pulleys of the drive of each degree of freedom are of the same size. By varying the pulley size from one driving kinematic chain to the successive one it is possible in the simplest way to transmit rotation with the axes intersecting. The driven pulley 16 (FIG. 2) is fast with the link 2, the guide pulleys 21, 22, 23, 24 and 25 are mounted for free rotation about their axle and are intended to vary the position of the ropes 11, 12, 13, 14 and 15 in accordance with the position or attitude of the link 2. The guide pulley 38 is likewise mounted for free rotation and is intended to vary the position of the tensioning rope run 37 in accordance with the position of the link 2. The driven pulley 17 (FIG. 3) is fast with the link 3. The guide pulleys 26, 27, 28 and 29 are mounted for free rotation about their axle and are intended to vary the position of the ropes 12, 13, 14 and 15 in accordance with the position of the link 3. The guide pulley 39 is likewise mounted for free rotation and is intended for varying the position of the tensioning rope run 37 in accordance with the position of the link 3. The driven pulleys 18, 19, 20 and the drum-shaped link 7, the guide pulleys 30, 31, 32, 33, 34, 35 and 36 of the driving kinematic chains, and the guide pulleys 40, 41, 42, 43 of the tensioning rope run 37 are intended for performing functions similar to those described hereinabove.

The base 1 has mounted thereon a tensioning mechanism and individual motors of the respective drives of the links of the arm shown in FIGS. 1, 2, 3. The ropes 10, 11, 12, 13, 14 and 15 (FIG. 4) of the driving kinematic chains of the links 2, 3, 4, 5, 6 and 7 are secured to driving drums 44, 45, 46, 47, 48 and 49, respectively. Each driving drum 44, 45, 46, 47, 48 and 49 is operatively connected to the respective individual motor: the drum 44 is connected to a motor 50, the drum 45 to a motor 51, the drum 46 to a motor 52, the drum 47 to a motor 53, the drum 48 to a motor 54, and, finally, the drum 49 is operatively connected to a motor 55.

Therefore, the motor 50 is an individual motor of the link 2, the motor 51 is that of the link 3, the motor 52 is that of the link 4, the motor 53 is that of the link 5, the motor 54 is that of the link 6, and the motor 55 is that of the link 7. The tensioning mechanism is a succession of six differential gears 56, 57, 58, 59, 60 and 61, equalling the number of the kinematic driving chains that are to be tensioned in the herein described embodiment. Outputs 62, 63, 64, 65, 66 and 67 of the differential gears 56, 57, 58, 59, 60, 61 are their respective carriers, whereas outputs 68, 69, 70, 71, 72, 73, 74, 75, 76, 77, 78 and 79 of the same differential gears are their respective sun gears.

The outputs 68 and 75, 69 and 76, 70 and 77, 71 and 78, 72 and 79 of the adjacent pairs 56 and 57, 57 and 58, 58 and 59, 59 and 60, 60 and 61 of the said differential gears are operatively interconnected in pairs, with the extreme or terminal output 74 of one extreme or terminal differential gear 56 being fast with the base 1, and the output 73 of the other extreme or terminal differential gear 61 being operatively connected with a tensioning member 80, e.g. a torsion bar. The tensioning member 80 is connected with a tensioning drum 81 having the tensioning rope run 37 secured thereto. Operatively interposed between the tensioning drum 81 and the tensioning member 80 is a mechanism for pre-tensioning the entire system of the mechanical gearing of the arm, which in the presently described embodiment includes a self-locking worm gear couple made up of a worm wheel 82 and a worm 83.

The outputs 62, 63, 64, 65, 66 and 67 of the differential gears 56, 57, 58, 59, 60 and 61 are operatively connected through reducers 84, 85, 86, 87, 88 and 89 and intermediate shafts 90, 91 92, 93, 94 and 95 with the individual motors 50, 51, 52, 53, 54 and 55, and with the driving drums 44, 45, 46, 47, 48 and 49 respectively.

The rope-based structures of the herein disclosed arm, on account of the insufficient oscillation-damping factor, is prone to develop oscillation of the links setting up the skeleton of the arm in motion. Therefore, it is expedient, in order to enhance the above factor, to have oscillation-damping means, either controllable or incontrollable, e.g. friction ones (not shown) incorporated in the pivots of the arm.

The mechanical arm of the presently described embodiment operates, as follows. With the individual motors 50, 51, 52, 53, 54 and 55 energized for rotation, the motion is transmitted via the intermediate shafts 90, 91, 92, 93, 94 and 95, the driving drums 44, 45, 46, 47, 48, 49 and the driving ropes 10, 11, 12, 13, 14 and 15 to the respective links 2, 3, 4, 5, 6 and 7.

Consequently, the relative positions of the links 2, 3, 4, 5, 6 and 7 are altered, and the configuration of the skeleton of the mechanical arm is altered accordingly. The angles of rotation preset for the individual motors 50, 51, 52, 53, 54 and 55 are summed up through the interconnected differential gears 56, 57, 58, 59, 60 and 61 and transmitted via the tensioning member 80 and the tensioning drum 81 to the tensioning rope run 37, with both ends of the tensioning member 80 being rotated without the latter being untwisted, whereby permanent tensioning of the tensioning rope run 37 and the tension in all the driving kinematic chains of the links 2, 3, 4, 5, 6 and 7 are ensured. A characteristic feature of the operation of the mechanical arm of this embodiment is the presence of kinematic interinfluence of the movements of the links 2, 3, 4, 5, 6 and 7 from their respective individual motors 50, 51 52, 53, 54 and 55. Thus, with solely the shaft of the motor 50 and the intermediate shaft 90 with the driving drum 44 and the rope 10 rotating, the driven pulley 16 and the link 2 would rotate relative to the base 1, and, besides, the link 3 would rotate relative to the link 2. Simultaneously, the tensioning member 80 and the tensioning drum 81 would be rotated via the reducer 84 and the differential gears 56, 57, 58, 59, 60 and 61. With solely the individual motor 51 and the intermediate shaft 91 with the driving 45 rotating, the link 3 would rotate relative to the link 2, and, besides, the link 4 would rotate relative to the link 3; with solely the individual motor 52 and the intermediate shaft 92 with the driving drum 46 rotating, the link 4 would rotate relative to the link 3, and, besides, the link 5 would rotate relative to the link 4; with solely the individual motor 53 and the intermediate shaft 93 with the drum 47 rotating, the link 5 would rotate relative to the link 4, and at the same time the link 6 would rotate relative to the link 5; with solely the individual motor 54 and the intermediate shaft 94 with the drum 48 rotating, the link 6 would rotate relative to the link 5, and at the same time the link 7 would rotate relative to the link 6; with solely the individual motor 55 and the intermediate shaft 95 with the driving drum 49 rotating, the link 7 would rotate relative to the link 6.

The combination of the angles of rotation of the drums 44, 45, 46, 47, 48 and 49 positively determines the relative positions or attitudes of the links 2, 3, 4, 5, 6 and 7, and, thus, the position and attitude of the link 7 is space. With any motions of the driving drums 44, 45, 46, 47, 48 and 49, there is ensured the tensioning of the driving kinematic chains, since the ends of the tensioning member 80 are always rotated in synchronism, whereby the ropes 10, 11, 12, 13, 14 and 15 and the tensioning rope run 37 are always taut, and play is taken up in the meshing of the teeth of the differential gears 56, 57, 58, 59, 60 and 61 and of the reducers 84, 85, 86, 87, 88 and 89.

Pretwisting of the tensioning member 80 is effected by rotating the worm 83.

In some applications and structural modifications, it may be expedient to provide the mechanical arm not with a single tensioning rope run, but with two or more such runs, e.g. on account of the strength ratings of the ropes used.

Illustrated in FIG. 5 is a modification of the arm, having an additional tensioning rope run providing for tensioning of the driving kinematic chains of the first two degrees of freedom.

In addition to the elements and components described in connection with FIGS. 1, 2 and 3 the arm of FIG. 5 includes another tensioning rope run 96 and two pulleys 97 and 98, the pulley 97 being mounted for free rotation about the rotation axis of the link 2 and acting as the guiding one, and the pulley 98 being fast with the link 3 and mounted about the latter's axis of rotation. The pulley 98 has one end of the tensioning rope run 96 secured thereto.

The driven pulley 16 (FIG. 6) is fast with the link 2, and the guide pulleys 21, 22, 23, 24 and 25 being mounted on the axle for free rotation, with the ropes 11, 12, 13, 14 and 15 running over them. The guide pulleys 38 and 97 are likewise mounted for free rotation, with the tensioning rope runs 37 and 96 running over them.

The driven pulley 17 (FIG. 7) is fast with the link 3. The guide pulleys 26, 27, 28 and 29 are mounted on the axle for free rotation, with the ropes 12, 13, 14 and 15 running over them. The guide pulley 39 is likewise mounted for free rotation, and the tensioning rope run 37 runs over it. The additional tensioning rope run 96 is secured to the driven pulley 98 fast with the link 3.

Figure 8:
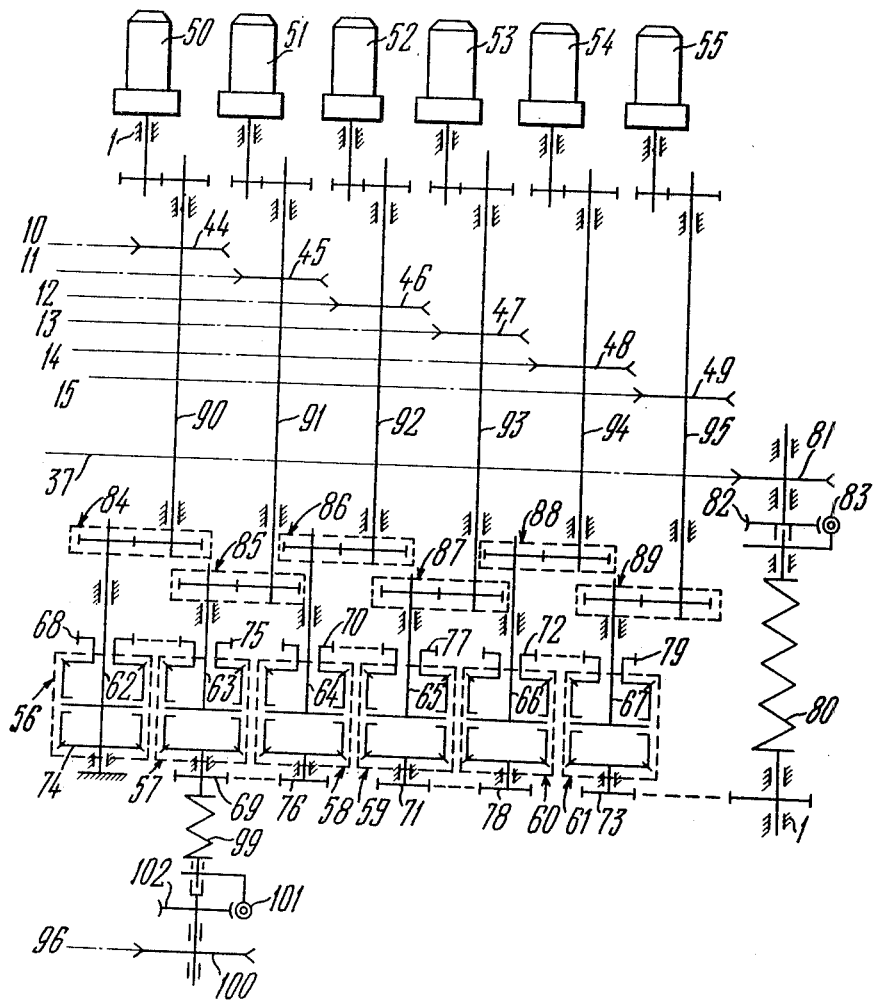
FIG. 8 shows a base supporting the tensioning mechanism and the individual motors actuating the links of the arm illustrated in FIG. 5.

The base 1 (FIG. 8) has mounted thereon the tensioning mechanism and the individual motors driving the links of the embodiment of the arm illustrated in FIGS. 5, 6 and 7. In addition to the components illustrated in FIG. 4, the tensioning mechanism (FIG. 8) includes another tensioning member 99 having one its ends operatively connected with the output 69 of the differential gear 57, and its other end operatively connected with a tensioning drum 100. This drum 100 has secured thereto the tensioning rope run 96 leading to the link 3 of the mechanical arm. In this kinematic chain a pre-tensioning mechanism is interposed intermediate the tensioning drum 100 and the tensioning member 99, including a self-locking worm gear couple made up of a worm 101 and a worm wheel 102. In this way there is constructed a tensioning rope run providing for additional (i.e. auxiliary to the main one) tensioning of the group of the driving kinematic chains associated with the first two links 2 and 3. Its characteristic feature is that it interconnects the individual motor 51 and the link 2 through the differential gear 57 and the resucer 85. It is possible to arrange in a similar way a plurality of additional tensioning rope runs, each providing for tensioning of the kinematic driving chains of its respective group of the links.

The rest of the components of the presently described embodiment of the mechanical arm are similar to those of the previously described embodiment.

The operation of the mechanical arm incorporating the additional tensioning rope run differs from that of the embodiment of the arm, illustrated in FIGS. 1 to 4 in that the tensioning member 99, the tensioning drum 100 and the tensioning rope run 96 (cf. FIGS. 5 and 8) provide additional tensioning of the driving kinematic chains of the links 2 and 3. The motion initiated by the independent motors 50 and 51 actuating, respectively, the links 2 and 3 is summed up at the output 69 of the differential gear 57 of the tensioning mechanism and is transmitted via the tensioning member 99, the tensioning drum 100 and the additional rope run 96 to the driven pulley 98 fast with the link 3. Consequently, the tensioning of the driving kinematic chains of the links 2 and 3 is defined by the total tensioning torque determined by the pre-twisting of both tensioning members 80 and 99, with the latter being likewise rotated without being untwisted. The tensioning member 99 is pre-twisted by rotating the worm 101.

The operation of the rest of the components of the mechanical arm corresponds to what has been already described in connection with the previously described embodiment.

The herein disclosed general structure of a mechanical arm allows the incorporation therein of a mechanism for compensating for kinematic interinfluence of the movements of the links, including differential gears. The incorporation of the last-mentioned differential gears in the kinematic chains is effected so that they become included in the tensioning circuits and have the play therein taken up.

Figure 9:
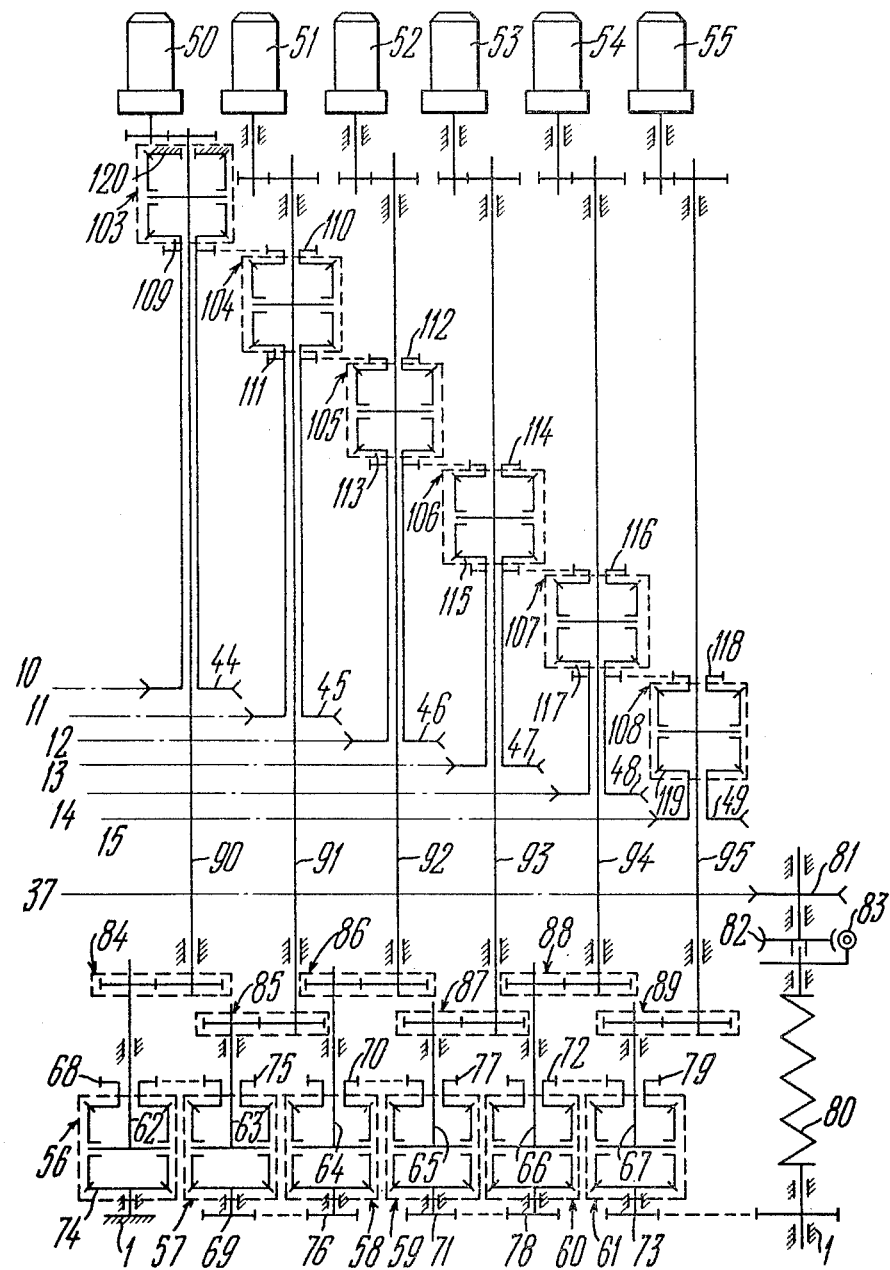
FIG. 9 shows a base supporting the individual motors and the mechanisms for tensioning and for compensating for kinematic interinfluence of the movements of the links of the arm illustrated in FIG. 1.

Illustrated schematically in FIG. 9 is the base 1 having mounted thereon individual motors, tensioning mechanisms and mechanisms for compensating for kinematic interinfluence of the movements of the links, associated with the embodiment of the mechanical arm, illustrated in FIGS. 1, 2 and 3. If compared with FIG. 4, FIG. 9 additionally shows a differential gear mechanism for compensating for kinematic interinfluence of the movements of the links, differential gears 103, 104, 105, 106, 107 and 108 of this compensating mechanism being interconnected serially. Thus, outputs 109 and 110, 111 and 112, 113 and 114, 115 and 116, 117 and 118 of the adjacent pairs of the differential gears 103 and 104, 104 and 105, 105 and 106, 106 and 107, 107 and 108 are operatively connected in pairs. The outputs 109, 111, 113, 115 and 117 are connected, respectively, with the driving drums 44, 45, 46, 47 and 48 of the driving kinematic chains. An output 119 of the terminal differential gear 108 of the series is connected to the driving drum 49. Also acting as the outputs of the differential gears 103, 104, 105, 106, 107 of the series are intermediate shafts 90, 91, 92, 93, 94 and 95 which are operatively connected with the respective individual motors 50, 51, 52, 53, 54, 55, and, through the reducers 84, 85, 86, 87, 88 and 89, with the outputs 62, 63, 64, 65, 66 and 67 of the differential gears 56, 57, 58, 59, 60 and 61 of the tensioning mechanism. Besides, an output 120 of the first differential gear 103 of the series is secured to the base 1.

The operation of the mechanical arm additionally incorporating the mechanism for compensating for kinematic interinfluence of the movements of the links, as illustrated in FIG. 9, is as follows. The rotation of the individual motors 50, 51, 52, 53, 54 and 55 is transmitted via the intermediate shafts 90, 91, 92, 93, 94 and 95 to the differential gears 103, 104, 105, 106, 107 and 108 of the compensating mechanism, and from the outputs 109, 111, 113, 115, 117 and 119 thereof it is transmitted to the driving drums 44, 45, 46, 47 48 and 49, wherefrom it is transmitted via the ropes 10, 11, 12, 13, 14 and 15 to the links 2, 3, 4, 5, 6 and 7.

Furthermore, the rotation is transmitted from the individual motors 50, 51, 52, 53, 54 and 55 via the intermediate shafts 90, 91, 92, 93, 94 and 95, and the reducers 84, 85, 86, 87, 88 and 89 to the outputs 62, 63, 64, 65, 66 and 67, respectively, of the differential gears 56, 57, 58, 59, 60 and 61 of the tensioning mechanism, which last-mentioned differential gears sum up the rotation values coming from the individual motors in due fashion and provide for rotation of the tensioning member 80 without untwisting the latter. The tensioning member 80 maintains the tension of the rope run 37 which provides for the tensioning of the driving kinematic chains by acting through the guide pulleys 38, 39, 40, 41, 42, 43 and the link 7 shaped as a drum. Since the outputs 109 and 62, 111 and 63, 113 and 64, 115 and 65, 117 and 66, 119 and 67, respectively, of the differential gears 103, 104, 105 106, 107 and 108 of the mechanism for compensating for kinematic interinfluence of the movements of the links and of the differential gears 56, 57, 58, 59, 60 and 61 of the tensioning mechanism are kinematically interconnected, all the differential gears 103, 104, 105, 106, 107 and 108 of the compensating mechanism become included into the tensioning circuit, whereby there is ensured taking-up of play and tensioning of all the differential gears and transmissions mounted on the base 1.

The incorporation in the structure of the mechanism for compensating for kinematic interinfluence of the links makes it possible to control the individual motors 50, 51, 52, 53, 54 and 55 so as if they were mounted directly in the pivots of the links 2, 3, 4, 5, 6 and 7 of the mechanical arm. This is attained by summing up in the differential gears 103, 104, 105, 106, 107 and 108 of the compensating mechanism of the corresponding movements of the individual motors. Thus, for instance, with solely the individual motor 50 actuating the link 2 operating, in addition to the rotation of the driving drum 44 there would be also rotated the drums 45, 46, 47, 48 and 49, compensating in this manner for "parasite" movements of the links 3, 4, 5, 6 and 7, caused by the presence of the guide pulleys 21, 22, 23, 24, 25 on the pivot axle of the link 2. Consequently, with the link 2 rotating relative to the base 1, the relative positions of the links 2 and 3, 3 and 4, 4 and 5, 5 and 6, 6 and 7 would remain unchanged. The function of compensation with the rest of the individual motors operating is performed in a similar way.

The herein disclosed structure of a mechanical arm may also incorporate a mechanism for compensating for the weight of the links 3, 4 and 5. Various modifications of the lastmentioned mechanism are illustrated in FIGS. 10 and 11, and in FIGS. 12 and 13.

Figure 10:
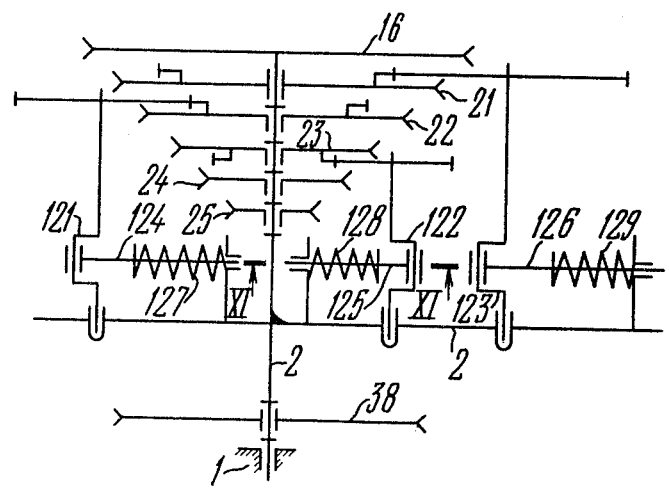
FIG. 10 shows the same as FIG. 2, plus a mechanism for compensating for the weight of the links.
Figure 11:
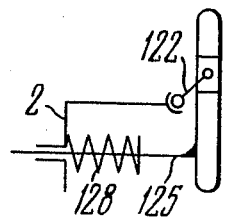
FIG. 11 is a sectional view taken on line XI—XI of FIG. 10.

Illustrated in FIG. 10 is a mechanism for compensating for the weight of the links 3, 4 and 5, mounted on the movable link 2. The weight-compensating mechanism includes three (i.e. the number equalling that of the counterbalanced links) sine mechanisms of which respective inputs 121, 122 and 123 are cranks, and outputs 124, 125 and 126 are crank guides, the outputs 124, 125 and 126 of these sine mechanisms being associated with resilient members 127, 128, 129, with each resilient member 127, 128 and 129 being arranged, respectively, between the output 124, 125 and 126 of the sine mechanism and its support. Thus, the resilient members 128 (FIG. 11) is interposed between the output 125 of the respective sine mechanism and its support which in this case is the movable link 2.

The inputs 121, 122 and 123 of the sine mechanisms (FIG. 10) are operatively connected with the guide pulleys 21, 22 and 23 of the driving kinematic chains of the respective links, these pulleys 21, 22 and 23 being mounted for free rotation about the pivot axle of the link 2. Thus, the input 123 of one sine mechanism is operatively connected with the guide pulley 21, the output 122 of the second sine mechanism is connected with the guide pulley 23, and the input 121 of the third sine mechanism is connected with the guide pulley 22.

The mechanism for compensating for the weight of the links 3, 4 and 5 operates as follows.

The guide pulleys 21, 22, 23 having the ropes 11, 12 and 13 running about them are loaded with torques created by the resilient members 129, 127 and 128 mounted at the outputs 126, 124 and 125 of the sine mechanisms, which torques are equal in value and opposite in the direction to the torques created by the gravity forces of the links 3, 4, and 5 relative to their pivots. Since the relative positions of the links 3, 4 and 5 are positively related to the positions of the sine mechanisms, the counterbalancing of the weight of the links 3, 4 and 5 is effected at any configuration of the arm. Thus, the torques created by the weight of the links 3, 4 and 5 are compensated for by the efforts of the resilient members 129, 127 and 128, and the independent motors 51, 52 and 53 are relieved of the static torques.

Figure 12:
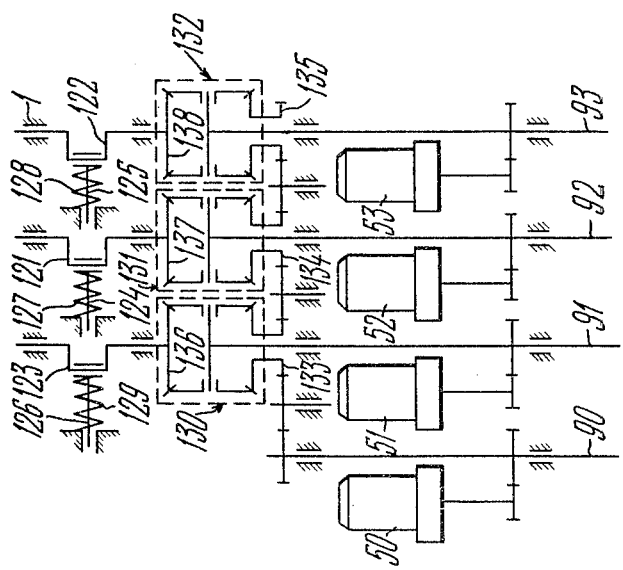
FIG. 12 is a modified version of the arrangement of the mechanism for compensating for the weight of the links on the base, in accordance with the structure illustrated in FIG. 4.

Illustrated in FIG. 12 is a modification of a mechanism for compensating for the weight of the links 3, 4 and 5, according to which this mechanism is mounted on the base 1 in the absence of the mechanism for compensating for kinematic interinfluence of the movements of the links, i.e. in the mechanical arm illustrated in FIGS. 1, 2, 3 and 4. If compared with FIG. 4, the structure illustrated in FIG. 12 additionally includes three differential gears 130, 131 and 132 and three sine mechanisms with resilient members 127, 128 and 129, the additional differential gears 130, 131 and 132 being kinematically interconnected through their outputs 133, 134 and 135, and connected with the individual motor 50 of the link 2 through the intermediate shaft 90. The other outputs of the respective differential gears 130, 131 and 132 are the intermediate shafts 91, 92 and 93 operatively connected with the individual actuating motors 51, 52 and 53 of the links 3, 4 and 5, respectively. The respective third outputs 136, 137 and 138 of the differential gears 130, 131 and 132 are connected with the inputs 123, 121 and 122 of the sine mechanisms. In this embodiment the resilient members 129, 127 and 128 are interposed between the outputs 126, 124 and 125 of the sine mechanisms and their support, i.e. the base 1.

The operation of the mechanism for compensating for the weight of the links 3, 4 and 5 of the presently described embodiment is as follows. The positions of the inputs 123, 121 and 122 of the sine mechanisms should be positively determined by the relative positions of the links 3, 4 and 5 exclusively. The elimination of the influence of the motion of the link 2 is attained by deducting an angle of rotation of the intermediate shaft 90 of the link 2 from the angles of rotation of the intermediate shafts 91, 92 and 93 of the drives of the links 3, 4 and 5. This action is effected by the differential gears 130, 131 and 132 of the weight-compensating mechanism, owing to the operative connection of their outputs 133, 134 and 135 with the intermediate shaft 90.

The resilient members 129, 127 and 128 at the outputs 126, 124 and 125 of the sine mechanisms produce torques equal in value and opposite in the direction to the torques created by the weight of the links 3, 4 and 5 relative to their pivots. Since the relative positions of the links 3, 4 and 5 are positively related to the positions of the sine mechanisms, the counterbalancing of the weight of the links 3, 4 and 5 is effected at any configuration of the arm, whereby the torques created by the weight of the links 3, 4 and 5 are compensated for by the efforts of the resilient members 129, 127 and 128, and the individual motors 51, 52 and 53 are relieved of the static torques.

Figure 13:
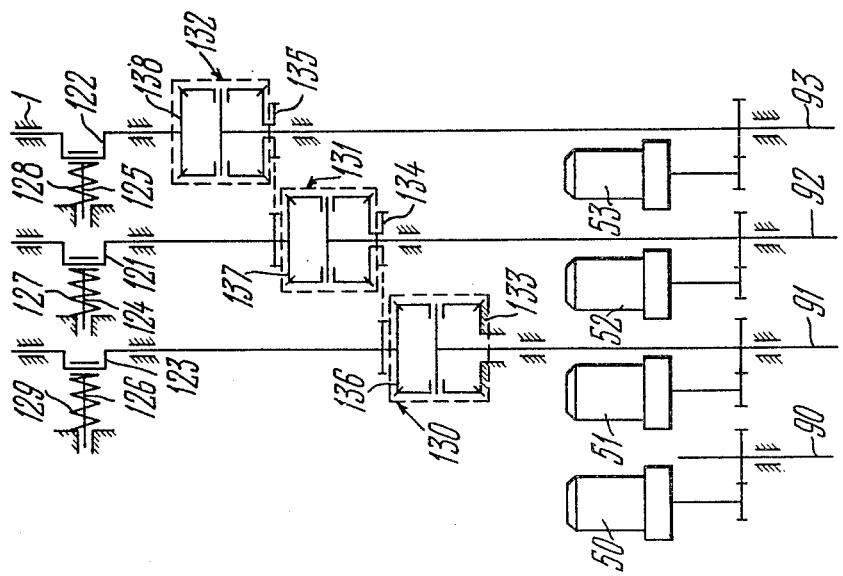
FIG. 13 is a modified version of the arrangement of the compensating mechanism on the base, in accordance with the structure illustrated in FIG. 9.

Illustrated in FIG. 13 is a modification of a mechanism for compensating for the weight of the links 3, 4 and 5 in an embodiment where this mechanism is mounted on the base 1, and the mechanical arm incorporates the mechanism for compensating for kinematic interinfluence of the movements of the links, i.e. in the mechanical arm illustrated in FIGS. 1, 2, 3 and 9.

As compared with the structure illustrated in FIG. 9, the structure illustrated in FIG. 13 additionally includes three differential gears 130, 131 and 132, and three sine mechanisms with resilient members 129, 127 and 128, the additionally included differential gears 130, 131 and 132 having their outputs 136 and 134, 137 and 135 interconnected in pairs, and the output 133 of the differential gear 130 being secured to the base 1. The outputs 136, 137 and 138 of the differential gears 130, 131 and 132 are connected with the respective inputs 123, 121 and 122 of the sine mechanisms. The third outputs of the additionally included differential gears 130, 131 and 132 are the intermediate shafts 91, 92 and 93 operatively connected with the individual motors 51, 52 and 53 actuating the links 3, 4, and 5, respectively. The resilient members 129, 127 and 128 are interposed between the outputs 126, 124 and 125 of the sine mechanisms and the support of the latter, i.e. the base 1 in this embodiment.

In the embodiment being described the operation of the mechanism for compensating for the weight of the links 3, 4 and 5 is as follows. The resilient members 129, 127 and 128 at the outputs 126, 124 and 125 of the sine mechanisms produce torques equal in value and opposite in the direction to the torques created by the weight of the links 3, 4 and 5 relative to their pivots. The position of the inputs 123, 121 and 122 of the sine mechanisms should be positively related exclusively to the relative positions of the links 3, 4 and 5.

The summing up of the rotation angles of the intermediate shafts 91, 92 and 93 is provided for by the incorporation of the differential gears 130, 131 and 132 and their operative connection through the outputs 136 and 134, 137 and 135.

Since the relative positions of the links 3, 4 and 5 are positively related to the position of the sine mechanisms, the counterbalancing of the weight of the links takes place at any configuration of the arm, whereby the torques produced by the weight of the links 3, 4 and 5 are compensated for by the efforts of the resilient members 129, 127 and 128, and the individual motors 51, 52 and 53 are relieved of the static torques.

To make the mechanical arm movable through stereotype motions with a permanent angle of inclination of any one of the links 3, 4 and 5 to a horizontal plane, the structure is to incorporate two groups of clutches, with the clutches of the first group connecting the inputs of the sine mechanisms to the supports of the latter, and the clutches of the second group connecting the respective individual drive motors of the links with their driving kinematic chains (FIG. 14).

The clutches 139, 140 and 141 of the first group are mounted on the movable link 2 and are adapted to lock the guide pulleys 22, 23 and 21 of the kinematic driving chains of the links 3, 4 and 5 (FIG. 1) through the inputs 121, 122 and 123 (FIG. 14) of the sine mechanisms relative to the link 2. However, the incorporation of the sine mechanisms per se is not necessary to provide for a stereotype motion.

The clutches of the second group are interposed between the individual drive motors 51, 52 and 53 of the links 3, 4 and 5 and the intermediate shafts 91, 92 and 93 respectively, (the clutches of the second group are not shown in FIG. 14).

In another embodiment of the mechanical arm incorporating a mechanism for compensating for kinematic interinfluence of the movements of the links, the clutches are mounted on the base 1 (FIG. 15). In this embodiment the clutches 141, 139 and 140 of the first group are adapted to lock the inputs 123, 121 and 122 of the sine mechanisms and the outputs 136, 137 and 138 of the differential gears 130, 131 and 132 of the link weight compensating mechanism, connected therewith, relative to the base 1 (the sine mechanisms are not shown in FIG. 15). The second group is made up of clutches 142, 143 and 144 interposed between the individual drive motors 51, 52 and 53 and the intermediate shafts 91, 92 and 93 of the kinematic driving chains of the links 3, 4 and 5, respectively.

Any random program-defined movement of the links 3, 4 and 5 is effected with the clutches 139, 140 and 141 (FIG. 14 and FIG. 15) disengaged, and the clutches 142, 143 and 144 engaged. In this mode of operation and inputs 123, 121 and 122 of the sine mechanisms are free to rotate, and the respective individual drive motors are connected with the intermediate shafts 91, 92 and 93. To effect a stereotype movement with a permanent angle of inclination of either one of the links 3, 4 or 5 to a horizontal plane, e.g. of the link 5, the clutch 140 is engaged to lock the guide pulley 23 of the kinematic driving chain of the link 5 relative to the link 2 (FIG. 14), or else to lock the output 138 of the differential gear 132 (FIG. 15) relative to the base 1; in either case the clutch 144 is disengaged to disconnect the individual motor 53 from the intermediate shaft 93. A similar control action is exerted on the clutches 139 and 143, or else 141 and 142, to perform a stereotype movement with the permanent angle of inclination of the links 3 and 4, respectively, to a horizontal plane.

To actuate the arm illustrated in FIGS. 1, 2, 3 and 4 through stereotype movements along vertical lines in the working space, it is additionally provided with a kinematic chain connecting the outputs of the sine mechanisms for counterbalancing the weight of the links 3 and 4, and with two clutches of which one is included into the last-mentioned chain, and the other one is interposed between the individual drive motor and the driving kinematic chain of one of these two links.

Figure 16:
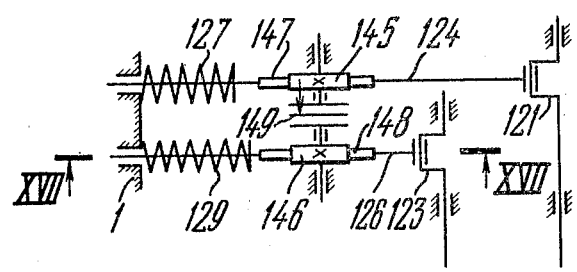
FIG. 16 shows components added to the kinematic chain of the mechanical arm to provide for a stereotype motion along horizontal lines.

Shown in FIG. 16 is a version of this additional kinematic chain interconnecting the outputs 126 and 124 of the sine mechanisms compensating for the weight of the links 3 and 4, this chain including toothed pinions 145 and 146 and racks 147 and 148, the racks 147 and 148 being mounted at the outputs 124 and 126 of the respective sine mechanisms, and the pinions 145 and 146 being interconnected through a clutch 149.

Figure 17:
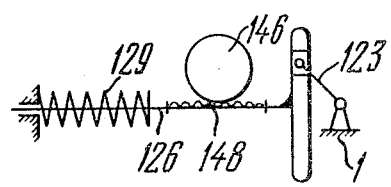
FIG. 17 is a sectional view taken on line XVII—XVII of FIG. 16.

The pinion 146 and the rack 148 (FIG. 17) at the output 126 of the sine mechanism are included thus in the additional kinematic chain providing for a stereotype movement along vertical lines within the working space.

Figure 18:
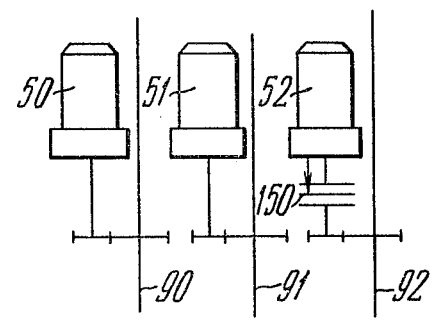
FIG. 18 shows coupling of the individual motors with the driving kinematic chains in performing a stereotype motion along horizontal lines.

Shown in FIG. 18 is another clutch 150 interposed between the individual motor 52 of the link 4 and the intermediate shaft 92 of the kinematic driving chain of the same link.

Normally, i.e. when the links 3 and 4 are to be driven through random motions, the clutch 149 (FIG. 16) is disengaged to break up the additional kinematic chain including the components 147, 145, 146 and 148, while the clutch 150 (FIG. 18) is engaged to connect the individual drive motor 52 of the link 4 with the intermediate shaft 92. Whenever it is necessary to perform a stereotype movement along vertical lines, the clutch 149 is engaged to complete the additional kinematic chain made up of the components 147, 145, 146 and 148, and the clutch 150 is disengaged by a signal coming from a program control device, to disconnect the individual drive motor 52 from the intermediate shaft 92 of the driving kinematic chain of the link 4. Consequently, the driving kinematic chains of the links 3 and 4 become interconnected by the additional kinematic chain and their coordinated motion is effected from the single individual motor 51.

Figure 19:
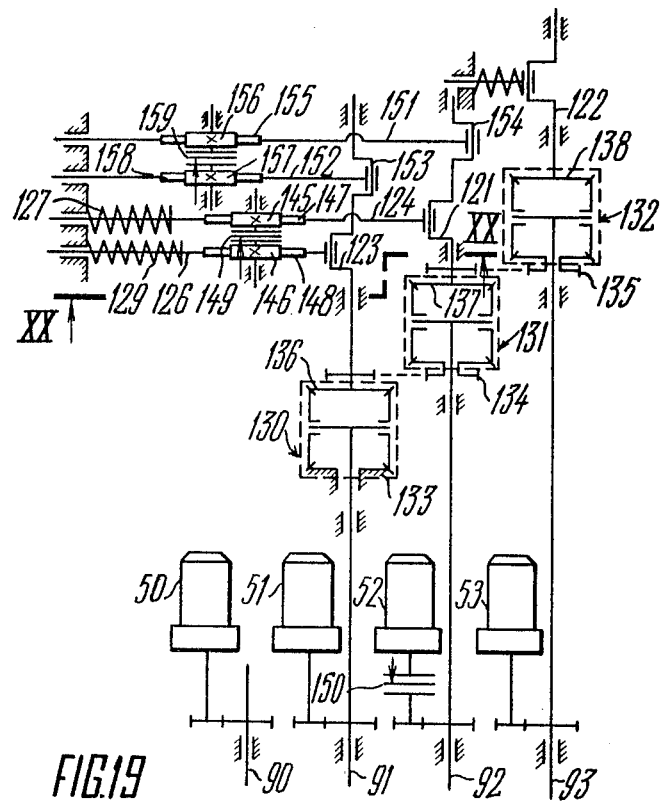
FIG. 19 is a modification of the structure providing for stereotype motions along vertical and horizontal lines for the embodiment of FIG. 9.

Illustrated in FIG. 19 is a modification of the mechanism for compensating for the weight of the links, providing for stereotype movements along both vertical and horizontal lines within the working space. The rest of the mechanisms of the arm of this embodiment may be those illustrated schematically in FIGS. 1, 2, 3, 9, 13, 16 and 17. As shown in FIG. 19, the mechanism for compensating for the weight of the links additionally includes two sine mechanisms with outputs 151 and 152 having the common inputs 121 and 123 with the sine mechanisms shown in FIG. 16. The inputs 153 and 154 of the additional sine mechanisms are angularly shifted relative to the respective inputs 123 and 121 through 90°.

The outputs 151 and 152 of the sine mechanisms are interconnected by still another additional kinematic chain including the following components: a rack 155 mounted at the output 151, pinions 156 and 157, and a rack 158 mounted at the output 152, with a clutch 159 interposed between the pinions 156 and 157. The other clutch 150 is interposed between the individual motor 52 and the intermediate shaft 92.

Figure 20:
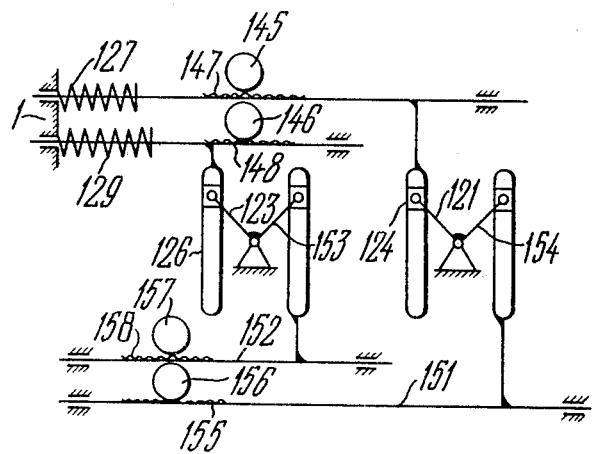
FIG. 20 is a sectional view taken on line XX—XX of FIG. 19.

Shown in FIG. 20 is an evolution of the section along line XX—XX in FIG. 19, illustrating the relative positions of the inputs 123 and 153, 121 and 154 and outputs 126 and 124, 152 and 151 of the sine mechanisms, the inputs 123 and 153 being phase-shifted through 90°, and the inputs 121 and 154 being likewise phase-shifted through 90°. The pinions 145 and 146 are interconnected with the clutch 149, and the pinions 156 and 157 are interconnected with a clutch 159.

The additionally incorporated sine mechanisms (FIGS. 19, 20) of which the inputs 153 and 154 are phase-shifted through 90° relative to the inputs 123 and 121 of the sine mechanisms for compensating for the weight of the links 3 and 4, and the additional kinematic chain including the components 156, 155, 157 and 158 operate similarly to the sine mechanisms and additional kinematic chains illustrated in FIGS. 16 and 18, but the clutch 159 now provides for actuating the link 8, e.g. the gripping jaw, through a stereotype movement along horizontal lines.

To actuate the arm illustrated in FIGS. 1, 2, 3 and 4 through stereotype motions along radii extending through the axis of rotation of the link 3, the arm is additionally provided with a kinematic chain interconnecting the driving kinematic chains of the links 3 and 4, and with two clutches of which one is included in this additional kinematic chain, and the other is interposed between the individual motor and the driving kinematic chain of one of these two links.

Figure 21:
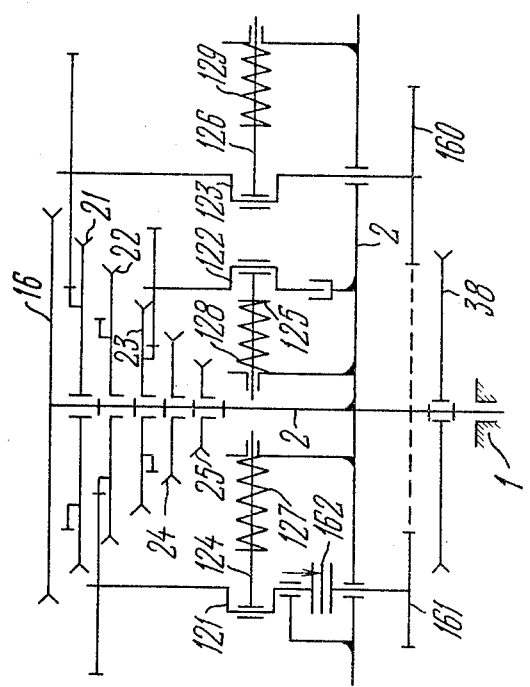
FIG. 21 shows the same as FIG. 10, with an additional kinematic chain and a clutch, providing for a stereotype motion along radii extending through the pivot axis of one of the links.

Illustrated in FIG. 21 is a version of the arrangement of the last-mentioned additional kinematic chain in the embodiment wherein the mechanism for compensating for the weight of the links is mounted on the link 2, i.e. the embodiment illustrated in FIG. 10.

The components of the additional kinematic chain interconnecting the duide pulleys 21 and 22 of the driving kinematic chains of the links 3 and 4 are pinions 160 and 161, with a clutch 152 included in this additional chain. The arrangement of the other clutch 150 is illustrated in FIG. 18.

Figure 22:
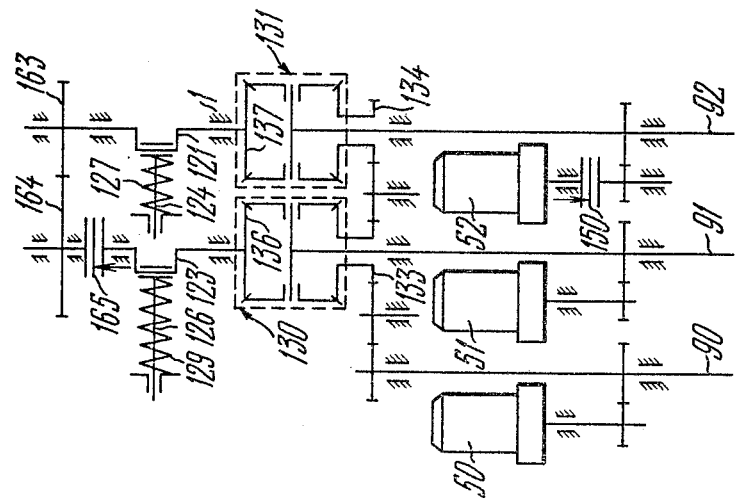
FIG. 22 is a modification of the structure providing for a stereotype motion along radii extending through the pivot axis of one of the links for the embodiment shown in FIG. 4.

Illustrated in FIG. 22 is an additional kinematic chain supported by the base 1, in an embodiment devoid of a mechanism for compensating for kinematic interinfluence of the movements of the links. In this embodiment the components of the additional kinematic chain interconnecting the driving kinematic chains of the links 3 and 4 are pinions 163 and 164 at the inputs 121 and 123 of the sine mechanisms for compensating for the weight of the links 3 and 4. A clutch 165 is included in the additional kinematic chain, with the functions of the other clutch performed by the clutch 150.

Figure 23:
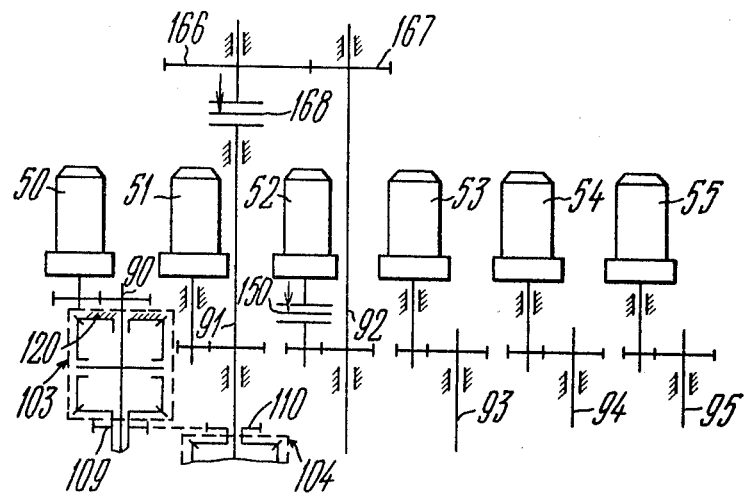
FIG. 23 is a modification of the structure providing for a stereotype motion along radii extending through the pivot axis of one of the links for the embodiment shown in FIG. 9.

With the mechanism for compensating for kinematic interinfluence of the movements of the links incorporated in the arm, the additional kinematic chain may interconnect the intermediate shafts 91 and 92. This version of the arrangement of the additional kinematic chain is illustrated in FIG. 23. Here the componenis of this chain are pinions 166 and 167 mounted on the intermediate shafts 91 and 92, respectively, with a clutch 168 additionally included in this chain. Same as in the previously described embodiment, the other clutch is the clutch 150.

The stereotype motion along radii extending through the axis of the pivot of the link 3, with the additional kinematic chain mounted on the movable link 2 (FIG. 21), is provided for by locking the guide pulleys 21 and 22 with aid of the pinions 160, 161 and the clutch 162. With the latter engaged, there is ensured a permanent transmission ratio of the relative speeds of the links 3 and 4. With equal lengths of the links 3 and 4, the transmission ratio of the additional kinematic chain equals 2:3. When the clutch 162 is engaged to complete the additional kinematic chain, the clutch 150 is disengaged.

The same stereotype motions in embodiments where the additional kinematic chain is mounted on the base 1 (FIG. 22) are provided for by the pinions 163, 164 and the clutch 165, arranged at the inputs 123 and 121 of the link-weight compensating sine mechanisms. The operation of this additional kinematic chain is identical to one described hereinabove.

In embodiments incorporating the mechanism for compensating for kinematic interinfluence of the movements of the links, the additional kinematic chain providing for a stereotype motion along radii extending through the axis of the pivot of the link 3 includes the pinions 166, 167 and the clutch 168 (FIG. 23) interconnecting the intermediate shafts 92 and 91 of the drives of the links 3 and 4. With equal lengths of the links 3 and 4 the transmission ratio of this kinematic chain is 1:2. With the clutch 168 engaged and the clutch 150 disengaged, the angular speeds of the links 3 and 4 have the ratio of 1:2, whereby there is performed a movement of the link 5 off its pivot along a radius extending from the axis of the pivot of the link 3, the motion of the links 3 and 4 being supplied solely by the motor 51.

To actuate the arm through a stereotype motion with a permanent indexing or attitude of the link 6 in a horizontal plane, there is incorporated an additional kinematic chain interconnecting the driving kinematic chains of the links 2 and 6 with the vertical pivot axles of these links, and there are additionally provided two clutches of which one is included in the last-mentioned kinematic chain and the other one is interposed between the individual motor and driving kinematic chain of one of the links.

Figure 24:
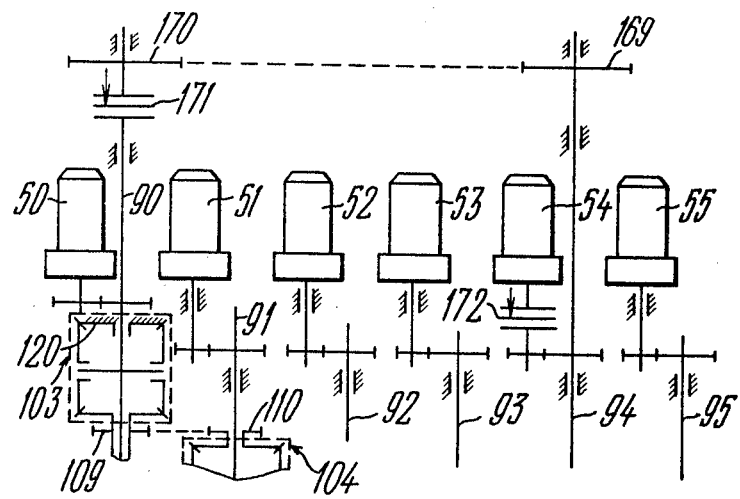
FIG. 24 is a modification of the structure providing for a stereotype motion with a permanent attitude of the axis of the gripper in a horizontal plane.

Illustrated in FIG. 24 is a version of this additional kinematic chain in an arm including the mechanism for compensating for kinematic interinfluence of the movements of the links, of the type illustrated in FIGS. 1, 2, 3 and 9.

The components of this additional kinematic chain are pinions 169 and 170 interconnecting the intermediate shafts 90 and 94 of the driving kinematic chains of the links 2 and 6. A clutch 171 is included in this additional kinematic chain, and another clutch 172 is interposed between the individual motor 54 and the intermediate shaft 94 of the drive of the link 6.

A similar additional kinematic chain is provided between the kinematic driving chains of the links 2 and 7, this connection enabling a stereotype movement with a permanent attitude of the link 8, i.e. of the gripping jaw, with a vertical attitude of the pivot axis of the link 7.

A stereotype movement with a permanent attitude of the gripper in a horizontal plane is effected by engaging the clutch 171 (FIG. 24) to complete the additional kinematic chain including the pinions 169 and 170 mounted on the intermediate shafts 94 and 90 of the drives of the links 6 and 2, the disengaging the clutch 172 to disconnect the individual motor 54 from the intermediate shaft 94 of the drive of the link 6. The permanent vertical indexing of the axis of rotation of the link 6 may be ensured by engaging the clutch 140 (FIG. 15) and disengaging the clutch 144. It is obvious that before the last-described stereotype motion is possible, the arm is to be actuated into a position where the axis of rotation of the pivot 5 is vertical. The program control of all the abovementioned clutches makes it possible to combine the abovelisted versions of stereotype motions with random movements of the various degrees of freedom in accordance with a preset general program. For this end, i.e. to engage and disengage the stereotype motions of the arm, the clutches 139, 140, 141, 142, 143, 144, 149, 150, 159, 162, 168, 171, 172, 165 are controllable from the program control unit.

What is claimed is:

1. A mechanical arm comprising: a base; a plurality of pivotally connected links supported by said base; a plurality of individual motors in a number equalling that of said links; each said motor being connected through driving kinematic chains with the respective one of said links; a tensioning mechanism of which the tensioning member is operatively connected with said links through tensioning kinematic chains; differential gears of said tensioning mechanism, in a number equalling that of the driving kinematic chains tensioned by said tensioning member, one output of each said differential gear being operatively connected to one of said individual motors and two other outputs thereof being operatively connected with the preceding and successive ones of said differential gears, the two free outputs of the two terminals ones of said differential gears being operatively connected, respectively, to said base and to said tensioning member.

2. A mechanical arm of claim 1, comprising an additional tensioning member connected to the output of one of said differential gears, and also connected through an additional kinematic chain to the respective one of said links of the mechanical arm.

3. A mechanical arm of claim 1, wherein the kinematic chains of said tensioning mechanism are in the form of rope-and-pulley transmissions.

4. A mechanism arm of claim 1, wherein the tensioning member of said tensioning mechanism is in the form of a torsion bar.

5. A mechanical arm of claim 2, wherein the tensioning members of the tensioning mechanisms are in the form of torsion bars.

6. A mechanical arm comprising: a base; a plurality of pivotally connected links supported by said base; a plurality of individual motors in a number equalling that of said links, each said motor being connected through driving kinematic chains with the respective one of said links; a tensioning mechanism including a tensioning member operatively connected through tensioning kinematic chains with said links; differential gears in said tensioning mechanism, in a number equalling that of the driving kinematic chains tensioned by said tensioning member, one output of each said differential gear being connected to one of said motors, and two other outputs thereof being connected to the preceding and successive ones of said differential gears, and the two free outputs of the two terminal ones of said differential gears being connected, respectively, to said base and to said tensioning member; a mechanism for compensating for kinematic interinfluence of the movements of said links, including a plurality of serially connected differential gears wherein one output of each differential gear is connected with the respective one of said driving kinematic chains and with the output of the successive differential gear, and the other output is connected with said individual motor and with the output of the respective one of said differential gears of said tensioning mechanism.

7. A mechanical arm comprising: a base; a plurality of pivotally connected lines supported by said base; a plurality of individual motors in a number equalling that of said links, each said motor being connected through driving chains with the respective one of said links; a tensioning mechanism including a tensioning member connected through tensioning kinematic chains with said links; differential gears of said tensioning mechanism, in a number of equalling that of the driving kinematic chains tensioned by said tensioning member, one output of each said differential gear being connected to one of said motors, and two other outputs thereof being connected to the preceding and successive ones of said differential gears, the two free outputs of the two terminal ones of said differential gears being connected, respectively, to said base and to said tensioning member; a mechanism for compensating for the weight of said links, including sine mechanisms and resilient members interposed between the outputs and supports of said sine mechanisms, the input of each said sine mechanism being connected with said driving kinematic chain of the respective one of said links.

8. A mechanical arm comprising: a base; a plurality of pivotally connected links supported by said base; a plurality of individual motors in a number equalling that of said links, each said motor being connected through driving kinematic chains with the respective one of said links; a tensioning mechanism including a tensioning member operatively connected through tensioning kinematic chains with said links; differential gears in said tensioning mechanism, in a number equalling that of the driving kinematic chains tensioned by said tensioning member, one output of each said differential gear being connected to one of said motors, and two other outputs thereof being connected to the preceding and successive ones of said differential gears, and the two free outputs of the two terminal ones of said differential gears being connected, respectively, to said base and to said tensioning member; a mechanism for compensating for kinematic interinfluence of the movements of said links, including a plurality of serially connected differential gears wherein one output of each differential gear is connected with the respective one of said driving kinematic chains, and the other output thereof is connected with said individual motor and the output of the respective one of said differential gears of said tensioning mechanism; a mechanism for compensating for the weight of said links, including sine mechanisms and resilient members interposed between the outputs and supports of said sine mechanisms, the input of each said sine mechanism being connected with said driving kinematic chain of the respective one of said links.

9. A mechanical arm comprising: a base; a plurality of pivotally connected links supported by said base; a plurality of individual motors in a number equalling that of said links, each said motor being connected through driving kinematic chains with the respective one of said links; a tensioning mechanism including a tensioning member operatively connected through tensioning kinematic chains with said links; differential gears in said tensioning mechanism, in a number equalling that of the driving kinematic chains tensioned by said tensioning member, one output of each said differential gear being connected to one of said motors and the two other outputs thereof being connected to the preceding and successive ones of said differential gears, and the two free outputs of the two terminal ones of said differential gears being connected, respectively, to said base and to said tensioning member; a mechanism for compensating for kinematic interinfluence of the movements of said links, including differential gears connected is series, wherein one output of each differential gear is connected with the respective one of said driving kinematic chains and with the output of the successive differential gear, and the other output thereof is connected with the respective one of said individual motors and with the output of the respective one of said differential gears of said tensioning mechanism; a mechanism for compensating for the weight of the links, including sine mechanisms, resilient member interposed between the outputs and supports of said sine mechanisms, and interconnected differential gears interposed intermediate the inputs of said sine mechanisms and said driving kinematic chains of said links.

10. A mechanical arm of claim 7, including to provide for actuating the arm through stereotype motions with a permanent angle of inclination of any one of said links to a coordinate plane, e.g. a horizontal one, two groups of clutches, the clutches of the first group connecting the inputs of said sine mechanisms with the supports thereof, and the clutches of the second group connecting said independent motors with said driving kinematic chains.

11. A mechanical arm of claim 8, including, to provide for actuating the arm through stereotype motions with a permanent angle of inclination of any one of said links to a coordinate plane, e.g. a horizontal one, two groups of clutches, the clutches of the first group connecting the inputs of said sine mechanisms with the supports thereof, and the clutches of the second group connecting said individual motors with said driving kinematic chains.

12. A mechanical arm of claim 9, including, to provide for actuating the arm through stereotype motions with a permanent angle of inclination of any one of said links to a coordinate plane, e.g. a horizontal one, two groups of clutches, the clutches of the first group connecting the inputs of said sine mechanisms with the supports thereof, and the clutches of the second group connecting said individual motors with said driving kinematic chains.

13. A mechanical arm of claim 7, including, in order to provide for actuating the arm through stereotype motions along two mutually perpendicular directions in the working space, e.g. along vertical or horizontal lines, an additional kinematic chain interconnecting the output members of said sine mechanisms, and two clutches of which one is included in said additional kinematic chain and the other one is interposed between said individual motor and said driving kinematic chain of one of said links.

14. A mechanical arm of claim 8, including, in order to provide for actuating the arm through stereotype motions along two mutually perpendicular directions in the working space, e.g. along vertical or horizontal lines, an additional kinematic chain interconnecting the output members of said sine mechanisms, and two clutches of which one is included in said additional kinematic chain and the other one is interposed between said individual motor and said driving kinematic chain of one of said links.

15. A mechanical arm of claim 9, including, in order to provide for actuating the arm through stereotype motions along two mutually perpendicular directions in the working space, e.g. along vertical or horizontal lines, an additional kinematic chain interconnecting the output members of said sine mechanisms, and two clutches of which one is included in said additional kinematic chain and the other one is interposed between said individual motor and said driving kinematic chain of one of said links.

16. A mechanical arm of claim 7, including, in order to provide for actuating the arm through a stereotype motion along radii extending through the axis of the rotation couple of the first one of two adjacent ones of said links, and additional kinematic chain interconnecting the inputs of said sine mechanisms and two clutches of which one is included in said additional kinematic chain and the other one is interposed between said individual motor and said driving kinematic chain of one of said links.

17. A mechanical arm of claim 8, including, in order to provide for actuating the arm through a stereotype motion along radii extending through the axis of the rotation couple of the first one of two adjacent ones of said links, an additional kinematic chain interconnecting the inputs of said sine mechanisms and two clutches of which one is included in said additional kinematic chain and the other one is interposed between said individual motor and said driving kinematic chain of one of said links.

18. A mechanical arm of claim 9, including, in order to provide for actuating the arm through a stereotype motion along radii extending through the axis of the rotation couple of the first one of two adjacent ones of said links, an additional kinematic chain interconnecting the inputs of said sine mechanisms and two clutches of which one is included in said additional kinematic chain and the other one is interposed between said individual motor and said driving kinematic chain of one of said links.

19. A mechanical arm of claim 6, including, in order to provide for actuating the arm through a stereotype motion along radii extending through the axis of the rotation couple of the first one of two adjacent ones of said links, an additional kinematic chain interconnecting the respective ones of said driving kinematic chains of said last-mentioned links, and two clutches of which one is included in said additional kinematic chain and the other one is interposed between said individual motor and said driving kinematic chain of either one of said links.

20. A mechanical arm of claim 6, including, in order to provide for a stereotype motion with a permanent indexing of one said link in a coordinate plane, e.g. a horizontal one, an additional kinematic chain interconnecting the shafts of said individual motors adapted to actuate said links relative to the pivots with vertical axes, and two clutches of which one is included in said additional kinematic chain and the other is interposed between said individual motor and said driving kinematic chain of one of said links.

21. A mechanical arm of claim 10, wherein said clutches are program-controlled.

22. A mechanical arm of claim 11, wherein said clutches are program-controlled.

23. A mechanical arm of claim 12, wherein said clutches are program-controlled.

24. A mechanical arm of claim 13, wherein said clutches are program-controlled.

25. A mechanical arm of claim 14, wherein said clutches are program-controlled.

26. A mechanical arm of claim 15, wherein said clutches are program-controlled.

27. A mechanical arm of claim 16, wherein said clutches are program-controlled.

28. A mechanical arm of claim 17, wherein said clutches are program-controlled.

29. A mechanical arm of claim 18, wherein said clutches are program-controlled.

30. A mechanical arm of claim 19, wherein said clutches are program-controlled.

31. A mechanical arm of claim 20, wherein said clutches are program-controlled.

* * * * *